United States Patent
Yakes et al.

(10) Patent No.: US 7,164,977 B2
(45) Date of Patent: Jan. 16, 2007

(54) A/C BUS ASSEMBLY FOR ELECTRONIC TRACTION VEHICLE

(75) Inventors: Christopher K. Yakes, Oshkosh, WI (US); Jon J. Morrow, Neenah, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/718,051

(22) Filed: Mar. 16, 2004

(65) Prior Publication Data

US 2004/0133332 A1    Jul. 8, 2004

Related U.S. Application Data

(62) Division of application No. 09/774,981, filed on Jan. 31, 2001, now Pat. No. 6,757,597.

(51) Int. Cl.
*G06F 17/30* (2006.01)
*H02P 9/04* (2006.01)
*B60L 11/08* (2006.01)

(52) U.S. Cl. ............................. 701/36; 701/22; 705/27
(58) Field of Classification Search ................. 701/22; 180/65.1–65.8; 705/26, 27
See application file for complete search history.

(56) References Cited

U.S. PATENT DOCUMENTS

| | | |
|---|---|---|
| 1,951,089 A | 3/1934 | Fielder |
| 3,524,069 A | 8/1970 | Stepanov et al. |
| 3,690,559 A | 9/1972 | Rudloff |
| 3,764,867 A | 10/1973 | Smith |
| 3,799,284 A | 3/1974 | Hender |
| 3,865,209 A | 2/1975 | Aihara et al. |

(Continued)

FOREIGN PATENT DOCUMENTS

DE    1 816 183    6/1970

(Continued)

OTHER PUBLICATIONS

High Frequency AC vs. DC Distribution System for Next Generation Hybrid Electric Vehicle 1996 IEEE.

(Continued)

*Primary Examiner*—Thomas Black
*Assistant Examiner*—Marie A Weiskopf
(74) *Attorney, Agent, or Firm*—Foley & Lardner LLP

(57) ABSTRACT

An electronic traction vehicle comprising a principal power unit, a power storage unit mounted on a vehicle platform. A plurality of wheels are rotably mounted on the vehicle platform with an electric motor coupled to at least one wheel. A drive controller is coupled to the electric motor and a vehicle controller having an input and output terminal is coupled to the drive controller. A data bus network is coupled to the drive controller and the vehicle controller. An A/C bus assembly is coupled to the principal power unit, the power storage unit and the electric motor through the drive controller. Another embodiment of the electronic traction vehicle provides at least four electric motors and four drive controllers coupled to four wheels and the data bus network and A/C power bus assembly. Another embodiment of the electronic traction vehicle provides the components of the vehicle as moduled including an auxiliary module removably connected to the data bus network and the A/C bus assembly.

14 Claims, 3 Drawing Sheets

U.S. PATENT DOCUMENTS

| | | |
|---|---|---|
| 3,966,067 A | 6/1976 | Reese |
| 4,021,704 A | 5/1977 | Norbeck |
| 4,088,934 A | 5/1978 | D'Atre et al. ............... 318/227 |
| 4,097,925 A | 6/1978 | Butler, Jr. |
| 4,113,045 A | 9/1978 | Downing, Jr. |
| 4,196,785 A | 4/1980 | Downing |
| 4,292,531 A | 9/1981 | Williamson ................. 290/14 |
| 4,319,140 A | 3/1982 | Paschke |
| 4,336,418 A | 6/1982 | Hoag |
| 4,347,907 A | 9/1982 | Downing |
| 4,423,362 A | 12/1983 | Konrad et al. ............... 318/139 |
| 4,423,794 A | 1/1984 | Beck |
| 4,444,285 A | 4/1984 | Stewart et al. |
| 4,461,988 A | 7/1984 | Plunkett et al. ............. 318/802 |
| 4,533,011 A | 8/1985 | Heidemeyer et al. |
| 4,562,894 A | 1/1986 | Yang |
| 4,719,361 A * | 1/1988 | Brubaker .................... 290/45 |
| 4,760,275 A | 7/1988 | Sato et al. ................. 307/10 R |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Gotz et al. |
| 5,046,007 A | 9/1991 | McCrery et al. |
| 5,067,932 A | 11/1991 | Edwards |
| 5,081,832 A | 1/1992 | Mowill |
| 5,120,282 A | 6/1992 | Fjallstrom |
| 5,124,915 A | 6/1992 | Krenzel |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. ............... 318/139 |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. ................. 361/6 |
| 5,389,825 A | 2/1995 | Ishikawa et al. |
| 5,409,425 A | 4/1995 | Shibahata |
| 5,418,437 A | 5/1995 | Couture et al. |
| 5,445,347 A | 8/1995 | Ng |
| 5,448,561 A | 9/1995 | Kaiser et al. |
| 5,493,490 A * | 2/1996 | Johnson ....................... 705/26 |
| 5,504,655 A | 4/1996 | Underwood et al. |
| 5,508,594 A | 4/1996 | Underwood et al. |
| 5,508,689 A | 4/1996 | Rado et al. ............. 340/825.06 |
| 5,516,379 A | 5/1996 | Schultz |
| 5,538,274 A | 7/1996 | Schmitz et al. ............. 280/666 |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. ............... 318/139 |
| 5,575,730 A | 11/1996 | Edwards et al. |
| 5,575,737 A | 11/1996 | Weiss |
| 5,586,613 A | 12/1996 | Ehsani ....................... 180/65.2 |
| 5,589,743 A | 12/1996 | King |
| 5,592,375 A * | 1/1997 | Salmon et al. ................. 705/7 |
| 5,619,412 A | 4/1997 | Hapka |
| 5,629,567 A | 5/1997 | Kumar ......................... 290/3 |
| 5,629,603 A | 5/1997 | Kinoshita |
| 5,636,122 A | 6/1997 | Shah et al. |
| 5,646,510 A | 7/1997 | Kumar ....................... 322/16 |
| 5,669,470 A | 9/1997 | Ross |
| 5,672,920 A | 9/1997 | Donegan et al. ............ 307/147 |
| 5,679,085 A | 10/1997 | Fredriksen et al. |
| 5,732,074 A | 3/1998 | Spaur et al. |
| 5,767,584 A | 6/1998 | Gore et al. ................. 290/1 R |
| 5,812,959 A | 9/1998 | Froeburg et al. |
| 5,813,487 A | 9/1998 | Lee et al. |
| 5,813,488 A | 9/1998 | Weiss |
| 5,815,126 A | 9/1998 | Fan et al. |
| 5,819,201 A | 10/1998 | DeGraaf |
| 5,820,150 A | 10/1998 | Archer et al. ............... 280/124 |
| 5,828,554 A | 10/1998 | Donegan .................... 361/707 |
| 5,838,251 A | 11/1998 | Brinkmeyer et al. |
| 5,844,473 A | 12/1998 | Kaman |
| 5,847,520 A | 12/1998 | Theurillat et al. |
| 5,879,265 A | 3/1999 | Bek |
| 5,880,570 A | 3/1999 | Tamaki et al. |
| 5,881,559 A | 3/1999 | Kawamura |
| 5,895,454 A * | 4/1999 | Harrington ................... 705/26 |
| 5,913,210 A * | 6/1999 | Call .............................. 707/4 |
| 5,918,180 A | 6/1999 | Dimino |
| 5,922,040 A | 7/1999 | Prabhakaran |
| 5,924,879 A | 7/1999 | Kameyama .................. 322/16 |
| 5,925,993 A | 7/1999 | Lansberry ................... 318/139 |
| 5,928,291 A | 7/1999 | Jenkins et al. |
| 5,930,742 A | 7/1999 | Dodd et al. |
| 5,939,794 A | 8/1999 | Sakai et al. |
| 5,945,919 A | 8/1999 | Trask |
| 5,947,855 A | 9/1999 | Weiss |
| 5,950,144 A | 9/1999 | Hall et al. |
| 5,957,985 A | 9/1999 | Wong et al. |
| 5,973,463 A | 10/1999 | Okuda et al. |
| 5,986,416 A | 11/1999 | Dubois ....................... 318/139 |
| 5,995,898 A | 11/1999 | Tuttle |
| 5,998,880 A | 12/1999 | Kumar ......................... 290/40 |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,041,310 A * | 3/2000 | Green et al. .................. 705/27 |
| 6,054,844 A | 4/2000 | Frank |
| 6,088,650 A | 7/2000 | Schipper et al. |
| 6,104,148 A | 8/2000 | Kumar et al. |
| 6,105,984 A | 8/2000 | Schmitz et al. ............. 281/124 |
| 6,112,152 A | 8/2000 | Tuttle |
| 6,125,356 A * | 9/2000 | Brockman et al. ............ 705/37 |
| 6,141,608 A | 10/2000 | Rother |
| 6,154,658 A | 11/2000 | Caci |
| 6,157,889 A | 12/2000 | Baker |
| 6,181,994 B1 | 1/2001 | Colson et al. |
| 6,208,948 B1 | 3/2001 | Klingler et al. |
| 6,219,626 B1 | 4/2001 | Steinmetz et al. |
| 6,232,874 B1 | 5/2001 | Murphy |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,281,790 B1 | 8/2001 | Kimmel et al. |
| 6,285,932 B1 | 9/2001 | De Bellefeuille et al. |
| 6,298,932 B1 | 10/2001 | Bowman et al. |
| 6,370,454 B1 | 4/2002 | Moore |
| 6,387,007 B1 | 5/2002 | Fini, Jr. |
| 6,421,593 B1 | 7/2002 | Kempen et al. ............... 701/48 |
| 6,429,773 B1 | 8/2002 | Schuyler |
| 6,466,258 B1 | 10/2002 | Mogenis et al. |
| 6,487,717 B1 | 11/2002 | Brunemann et al. |
| 6,496,393 B1 | 12/2002 | Patwardhan |
| 6,501,368 B1 | 12/2002 | Wiebe et al. |
| 6,542,077 B1 | 4/2003 | Joao |
| 6,549,827 B1 | 4/2003 | Yen |
| 6,553,290 B1 | 4/2003 | Pillar |
| 6,580,953 B1 | 6/2003 | Wiebe et al. |
| 6,609,108 B1 * | 8/2003 | Pulliam et al. ............... 705/27 |
| 6,611,116 B1 | 8/2003 | Bachman et al. |
| 6,611,740 B1 | 8/2003 | Lowrey et al. |
| 6,615,186 B1 | 9/2003 | Kolls |

| | | |
|---|---|---|
| 6,636,790 B1 | 10/2003 | Lightner et al. |
| 6,694,234 B1 | 2/2004 | Lockwood et al. |
| 6,722,458 B1 | 4/2004 | Hofbauer |
| 6,757,597 B1 | 6/2004 | Yakes et al. |
| 6,798,344 B1 | 9/2004 | Faulkner et al. |
| 6,882,917 B1 | 4/2005 | Pillar et al. |
| 6,885,920 B1 | 4/2005 | Yakes et al. |
| 6,909,944 B1 | 6/2005 | Pillar et al. |
| 6,922,615 B1 | 7/2005 | Pillar et al. |
| 6,993,421 B1 | 1/2006 | Pillar et al. |
| 7,006,902 B1 | 2/2006 | Archer et al. |
| 7,024,296 B1 | 4/2006 | Squires et al. |
| 2001/0034573 A1 | 10/2001 | Morgan et al. |
| 2001/0034656 A1 | 10/2001 | Lucas et al. |
| 2001/0044769 A1* | 11/2001 | Chaves ............ 705/37 |
| 2002/0005304 A1 | 1/2002 | Bachman et al. |
| 2002/0010643 A1* | 1/2002 | Chaves ............ 705/26 |
| 2002/0015354 A1 | 2/2002 | Buckelew |
| 2002/0045507 A1 | 4/2002 | Bowen |
| 2002/0049523 A1 | 4/2002 | Diaz et al. |
| 2002/0065594 A1 | 5/2002 | Squires et al. |
| 2002/0065707 A1* | 5/2002 | Lancaster et al. ........ 705/10 |
| 2002/0107833 A1 | 8/2002 | Kerkinni |
| 2002/0111725 A1 | 8/2002 | Burge |
| 2002/0123832 A1 | 9/2002 | Gotvall et al. |
| 2002/0133273 A1 | 9/2002 | Lowrey et al. |
| 2003/0001736 A1 | 1/2003 | Lewis |
| 2003/0046179 A1* | 3/2003 | Anabtawi et al. ........ 705/26 |
| 2003/0081123 A1 | 5/2003 | Rupe |
| 2003/0105565 A1 | 6/2003 | Loda et al. |
| 2003/0105566 A1 | 6/2003 | Miller |
| 2003/0114965 A1 | 6/2003 | Flechter et al. |
| 2003/0130765 A1 | 7/2003 | Pillar et al. |
| 2003/0144011 A1 | 7/2003 | Richards et al. |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0163233 A1 | 8/2003 | Song et al. |
| 2003/0171854 A1 | 9/2003 | Pillar et al. |
| 2003/0182034 A1 | 9/2003 | Katagishi et al. |
| 2003/0195680 A1 | 10/2003 | Pillar |
| 2003/0200015 A1 | 10/2003 | Pillar |
| 2003/0205422 A1 | 11/2003 | Morrow et al. |
| 2003/0230443 A1 | 12/2003 | Cramer et al. |
| 2003/0233178 A1 | 12/2003 | Sinex |
| 2004/0002794 A1 | 1/2004 | Pillar et al. |
| 2004/0019414 A1 | 1/2004 | Pillar et al. |
| 2004/0021569 A1 | 2/2004 | Lepkofker et al. |
| 2004/0023635 A1 | 2/2004 | Impson et al. |
| 2004/0024502 A1 | 2/2004 | Squires et al. |
| 2004/0039502 A1 | 2/2004 | Wilson et al. |
| 2004/0039504 A1 | 2/2004 | Coffee et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0070515 A1 | 4/2004 | Burkley et al. |
| 2004/0133319 A1 | 7/2004 | Pillar et al. |
| 2004/0133332 A1 | 7/2004 | Yakes et al. |
| 2004/0199302 A1 | 10/2004 | Pillar et al. |
| 2004/0203974 A1 | 10/2004 | Seibel |
| 2005/0004733 A1 | 1/2005 | Pillar et al. |
| 2005/0038934 A1 | 2/2005 | Gotze et al. |
| 2005/0054351 A1 | 3/2005 | McAlexander |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119006 A1 | 6/2005 | Nasr et al. |
| 2005/0128431 A1 | 6/2005 | Jannard et al. |
| 2005/0131600 A1 | 6/2005 | Quigley et al. |
| 2005/0209747 A1 | 9/2005 | Yakes et al. |
| 2005/0234622 A1 | 10/2005 | Pillar et al. |

FOREIGN PATENT DOCUMENTS

| | | |
|---|---|---|
| DE | 41 11 865 A1 | 10/1991 |
| DE | 41 08 647 A1 | 9/1992 |
| DE | 44 31 929 C1 | 10/1995 |
| DE | 197 49 074 A1 | 5/1999 |
| DE | 199 29 434 A1 | 12/2000 |
| EP | 0 622 264 A2 | 4/1994 |
| EP | 0 791 506 A2 | 8/1997 |
| EP | 0 805 059 B1 | 11/1997 |
| EP | 0 812 720 B1 | 12/1997 |
| EP | 0 898 213 A1 | 7/1998 |
| EP | 1 018 451 A1 | 7/1999 |
| EP | 0 949 122 A2 | 10/1999 |
| EP | 1 092 406 A2 | 10/2000 |
| EP | 1 087 343 A1 | 3/2001 |
| EP | 0 564 943 B1 | 6/2001 |
| EP | 1 115 264 A2 | 7/2001 |
| EP | 1 229 636 A2 | 1/2002 |
| FR | 2 658 259 A1 | 8/1991 |
| GB | 1 308 318 | 2/1973 |
| GB | 2 263 376 A | 7/1993 |
| GB | 2 302 850 A | 2/1997 |
| JP | 60-216703 A | 10/1985 |
| JP | 2000-333160 A | 11/2000 |
| WO | WO 98/19875 A1 | 5/1998 |
| WO | WO 99/23783 A2 | 5/1999 |
| WO | WO 00/79727 A2 | 12/2000 |
| WO | WO 01/15001 A2 | 3/2001 |
| WO | WO 01/54939 A2 | 8/2001 |
| WO | WO 03/55714 A1 | 7/2003 |
| WO | WO 03/59455 A2 | 7/2003 |
| WO | WO 03/59455 A3 | 7/2003 |
| WO | WO 03/60831 A2 | 7/2003 |
| WO | WO 03/60831 A3 | 7/2003 |
| WO | WO 03/61235 A2 | 7/2003 |
| WO | WO 03/61235 A3 | 7/2003 |
| WO | WO 03/93046 A2 | 11/2003 |
| WO | WO 03/93046 A3 | 11/2003 |

OTHER PUBLICATIONS

History of Electric Vehicles in General Motors 1993 IEEE.
Automotive Electrical Systems: Architecture and Components 1999 IEEE.
High Power Density Electrical Drive For An Hybrid Electric Vehicle 1998 IEEE.
Wireless Link Corporation—News Room'; Jan. 9, 2001 Press Release (Calgary, Alberta) entitled "CSI Wireless Receives $7M Order from InterTrak"; 3-pg. document; [printed from Internet www. wireless-link.com/html;jan92001.html]; [Page dated Aug. 8, 2001].
Welcome to Modular Mining Systems, Inc.—Products'; "Products—Dispatch® Systems for Open Pit Mines"; 1-pg. document; [printed from Internet www.mmsi.com/modular/products/openpit/]; [Page dated Aug. 8, 2001].
Telematics Diagram, Vetronix Corporation, printed on Jul. 30, 2003 (1 page).
STE/ICE-R Design Guide for Vehicle Diagnostic Connector Assemblies, Report No. CR-82-588-003 REV Feb. 1, 1988, 182 pages.
SPORT Ad and Technical Specifications Sheet; Miltope Corporation, 2 pages.
Skibinsk, J. et al., "Intenet-based Vehicle Communication Network," SAE Technical Paper Series, Dec. 4-6, 2000, 8 pages.
S. Reitzner and M. Schleicher; 3SOFT GmbH, Erlangen/Germany; "Options and risks—PDAs in the automotive area"; Embedded Windows; ECE, Aug. 2001; 3 pgs.
RM CANview Bluetooth/TCP/IP, RM Michaelides Software & Electronic Corp. (2 pages).
Nathanson M., Vehicle Intelligence And Remote Wireless OBD, SAE Technical Paper , Dec. 4-6, 2000, 15 pages.

Miltope Receives $16 Million Defense System Integration Award, PRNewswire, Mar. 26, 2000, 1 page.

Miltope Receives $13.5 Million Order for SPORT, Jan. 25, 2000, Montgomery, AL, 1 page.

Luka, J and Stubhan, F, "Mobile Diagnosis," Vehicle Electronics Conference, 1999 (IVEC 99), proceedings of the IEEE International Changchun, China, Sep. 6-9, 1999, pp. 215-220.

J. S. Mussaf, "The Space Shuttle Clickable Map", Internet Apr. 1, 2001 (XP002235111); Retrieved from the Internet:: http://web.archive.org/web/2001040101 (24 pages).

Griffin, Jeff; 'Rental'; "Look, up in the sky . . . it's . . . it's a . . . fleet management satellite!"; 4 pg. document ; © 2000 American Rental Assocciation; © *2000 MobileNet*; [printed from Internet www.mobile-net.com/rental.htm]; [Page dated Aug. 8, 2001].

DriverTech—Wireless IP—Based Fleet Management System, DriverTech, Inc., printed on Jul. 29, 2003 (2 pages).

DriverTech—Hardware & Software, DriverTech, Inc., printed on Jul. 29, 2003 (3 pages).

DriverTech—Functional Specifications, DriverTech Inc., printed on Jul. 29, 2003 (5 pages).

DriverTech—Features, DriverTech, Inc., printed on Jul. 29, 2003 (1 page).

Dick Smith and Russ Walker; "Coming to a multiplex near you"; WasteAge.com; Fire Chief, Feb. 1, 2003; 5 pgs.

Dearborn Group Technology; Controller Area Network and In-Vehicle Networking Technology; "Dearborn Group Puts Wireless Vehicle Connectivity In Customers' Hands"; printed from website http://www.dgtech.com/press/pr_sae2001_jag_demo,phtml; Mar. 3, 2001; 3 pgs.

Computer Diagnoses Vehicle Deficiencies, Sgt. Shawn Woodard, Fort Jackson Leader, Jul. 26, 2002, 2 pages.

Barraco Klement, M.A., "Agile Support Project—Global Hawk Program," Jan.-Feb. 1999 pp. 66-70.

"Technology Products—Mine Star'; Minestar"1 2-pg. document; © *Caterpillar*; [printed from Internet www.caterpillar.com/products/shared/technology_products/01_prod]; [Page dated Aug. 8, 2001].

"Onboard Computer—Mobius TTS™ Smarter Mobile Logistics on the Road"; 4-pg. document; Cadec Corporation, Londonberry, NH; www.cadec.com.

"AssetVision™ Product Specification"; Wireless Link; 63-pg. document; Revision Date: May 18, 1999.

Welcome to Modular Mining Systems, Inc.—Products'; "Products—Vehicle Health System (VHS)"; 1-pg. document; [printed from Internet www.mmsi.com/modular/products/vhs/]; [Page dated Aug. 8, 2001].

'Vermeer Deal'; Nov. 1, 1999 Press Release (Alpharetta, GA) entitled "MobileNet asset monitoring system selected by Vermeer Manufacturing Company"; 2-pg. document; © *2000 MobileNet*; [printed from Internet www.mobile-net.com/vermeersignson.htm]; [Page dated Aug. 8, 2001].

'Trimble information Services'; "Trimble Information Services *Powering the Transformation of Location Data . . . into Location Information*"; 4-pg. document; [printed from Internet www.trimble.com/griddata/wp_trimble.htm]; [Page dated Aug. 8, 2001].

'TrakPak 2000'; "The TrakPak 2000—A Self-Contained Mobile Tracking Unit"; 2-pg. document; © *2000 MobileNet*; [printed from Internet www.mobile-net.com/prod02.htm]; [Page dated Aug. 8, 2001].

'Top 100'; "Construction Equipment's editors pick the 100 most significant product introductions of the year"; 1-pg. document; *Construction Equipment Magazine*, Dec. 1999 issue; © *2000 MobileNet*; [printed from Internet www.mobile-net.com.top100.htm]; [Page dated Aug. 8, 2001].

'Technology Products—VIMS'; "Technology Products"; 2-pg. document; © *Caterpillar*; [printed from Internet www.caterpillar.com/products/shared/technology_products/01_prod]; [Page dated Aug. 8, 2001].

'Products'; "MobileNet products"; 2-pg. document; © *2000 MobileNet*; [printed from Internet www.mobile-net.com/products.htm]; [Page dated Aug. 8, 2001].

'Products—Overview'; "Overview—The Right Stuff for 25 Years"; 2-pg. document; © 2001, Cadec Corporation; webmaster@cadec.com; [printed from Internet www.cadecorp.com/products.index.htm]; [Page dated Aug. 8, 2001].

'Products—Mobius TTS'; "Mobius TTS"; 3-pg. document; © 2001, *Cadac Corporation*, [printed from Internet www.cadeccorp.com/products.mobius.htm]; [Page dated Aug. 8, 2001].

'Products—Mobius TTS'; "Mobius TTS / Onboard Computer"; 2-pg. document; © 2001, *Cadec Corporation*, [printed from Internet www.cadeccorp.com/products/obc.htm]; [Page dated Aug. 8, 2001].

'Products—CMS Products'; "CMS Products"; 6-pg. document; © 2001, *Cadec Corporation*, [printed from Internet www.cadeccorp.com/products/cms_products.htm]; [Page dated Aug. 8, 2001].

'Nissan Motor Phils., Inc.'; RADIX Systems Service Corporation; Client: Nisson Motor Philippines, In..; Project: Design, Development and Implementation of a Corporate Information System; 1-pg. document; © *2000 RADIX Systems Services Corp.*; [printed from Internet www.radixsys.com/nmpi.htm]; [Page dated Aug. 8, 2001].

'MobilEmail'; "MobileNet MobilEmail"; 2-pg. document; © *2000 MobileNet*; [printed from Internet www.mobile-net.com/memail.htm]; [Page dated Aug. 8, 2001].

'Mobile Workstation'; "MobileNet Mobile Workstation"; 2-pg. document; © *2000 MobileNet*; [printed from Internet www.mobile-net.com/prod01.htm]; [Page dated Aug. 8, 2001].

'Introduction'; (Re:WDF Primer; 7-pg. document; [printed from Internet www.wispinc.com/Faq/primer.htm]; [Page dated Aug. 8, 2001].

zz'Interests'; "Global Remote Asset Monitoring"; 2-pg. document; © *2000 MobileNet*; [printed from Internet www.mobile-net.com/inside.htm]; [Page dated Aug. 8, 2001].

'IBM Press room'; Jun. 26, 2001 Press Release (White Plains, NY) entitled "IBM ServiceAfterSales Solutions Open Lucrative New Customer Service Markets For Manufacturers And Service Organizations"; 2-pg. document; [mprinted from Internet www.ibm.com/press/prnews.nsf/Print/5E98EA82D18E933385256A77]; [Page dated Aug. 8, 2001].

'I.D. Systems / Products Gallery'; "The I.D. Systems Product Gallery"; 3-pg. ducument; © *I.D. Systems, Inc.*; [printed from Internet www.id-systems.com/products_gallery,html]; [Page dated Aug. 8, 2001].

'Home Page'; "An Introduction to InterTrak"; 3-pg. document; © *2001 InterTrak Tracking Services, LLC.*; [printed from Internet www.trackmenow.com/bottom.htm]; [Page dated Aug. 8, 2001].

'HGI Wireless Inc. HGI Wireless Products and Services'; "Products and Services"; 2-pg. document; © *2001 HGI Wireless Inc.*; [printed from Internet www.hgiwireless.com/products_summary.html]; [Page dated Aug. 8, 2001].

'FAQ'; "Global Asset Monitoring"; 2-pg. document; © *1999 MobileNet*; [printed from Internet www.mobile-net.com/faq.htm]; [Page dated Aug. 8, 2001].

'Customer Applications'; "Benefits of Monitoring and Tracking of Heavy Equipment:"; 2-pg. document; © *2000 MobileNet*; [printed from Internet www.mobile-net.com/custapp.htm]; [Page dated Aug. 8, 2001].

'Construction'; "Equipment Tracking-A New Asset Management Method"; 3-pg. document; *Equipment Today*, Oct. 1999 issue; © 2000 MobileNet; [printed from Internet www.mobile-net.com/conequip.htm]; [Page dated Aug. 8, 2001].

'Caterpillar'; "Technology Products"; 2-pg. document; © *Caterpillar*; [printed from Internet www.caterpillar.com/products/shared/technology_products/01_prod]; [Page dated Aug. 8, 2001].

'AssetVision Brochure'; "AssetVision Brochure"; 3-pg. document; [printed from Internet www.csiwireless.ca/products/product_subfiles/assetvision_brochure]; [Page dated Aug. 8, 2001].

"WirelessRoad System Description," Vetronix Corporation, printed on Jul. 30, 2003 (5 pages).

"WirelessRoad Frequently Asked Questions," Vetronix Corporation, printed on Jul. 30, 2003 (2 pages).

"WirelessRoad Fleet Management System," Vetronix Corporation, printed on Jul. 30, 2003 (2 pages).

"Wireless CAN Bridge CB-300," Matric, Apr. 10, 2002 (20 pages).

"Vehicle Internet Port (VIP) System Description," Vetronix Corporation, printed on Jul. 30, 2003 (2 pages).

"Vehicle Internet Port (VIP)—Internet Access System for AutoPC," Vetronix Corporation, printed on Jul. 30, 2003 (1 page).

"Trimble and McNeilus Form Alliance to Factory-Install Fleet Management Solutions on Ready Mix Concrete Trucks," Mar. 19, 2002 (2 pages).

"Trimble and McNeilus Enhance Telvisant Fleet Management System for the Ready Mix Market," Feb. 4, 2003 (2 pages).

"Telvisant Fleet Management—The Concrete Solution," Trimble Navigation Limited, Mar. 2002 (2 pages).

"Televisant Ready Mix Industry Plan: maximize your ready mix fleet operation," 2003 (2 pages).

"European Search Report," European Patent Application No. 02001052.6 entitled "A/C Bus Assembly for Electronic Traction Vehicle," Aug. 21, 2003 (5pages).

"CarPort User's Guide Version 1.0," Vetronix Corporation, Nov. 1999 (40 pages).

"CarPort—The Only Link Between the Auto and the PC," Vetronix Corporation, printed on Jul. 30, 2003 (1 page).

"Advanced Wireless Technology for CAN and DeviceNet," Apr. 2003 (1 page).

* cited by examiner ns of the invention, these and other aspects will

A/C BUS ASSEMBLY FOR ELECTRONIC TRACTION VEHICLE

CROSS REFERENCE TO RELATED APPLICATIONS

This application is a Divisional application of U.S. application Ser. No. 09/774,981, filed Jan. 31, 2001, now U.S. Pat. No. 6,757,597.

FIELD OF THE INVENTION

The present invention relates generally to hybrid electric traction vehicles and, more particularly to an A/C bus assembly for an electronic traction vehicle

BACKGROUND OF THE INVENTION

In a conventional electric traction vehicle, a prime mover, such as a diesel engine, is used to drive an electric generator or alternator which supplies electric current to a plurality of traction motors. The traction motors typically are coupled to wheel sets on the vehicle. The vehicles that utilize this type of hybrid electric traction are typically railroad locomotives.

The prime mover drives the generator/alternator that typically produces an A/C current that is then fully rectified with resulting D/C current and voltage being distributed to current inverters coupled to the traction motors. Such systems are highly integrated with each of the components typically designed and manufactured to operate with the other components in the overall system. In other words, "off the shelf" components are not readily adaptable for use in the initial design or ongoing maintenance of such vehicles. Further, such vehicles have multiple components associated with the change of A/C to D/C to A/C power. Maintenance of such systems is expensive since specific components must be used.

Thus, there is a need for an electronic traction vehicle that is modular in design. There is a further need for an electronic traction vehicle that utilizes A/C power generated on the vehicle without converting the A/C power to D/C power. There is also a need for electronic traction vehicle that can be updated and upgraded as new technology and components become available without a required redesign of the overall vehicle system.

SUMMARY OF THE INVENTION

The present invention provides an electronic traction vehicle comprising a principal power unit, a power storage unit mounted on a vehicle platform. A plurality of wheels are rotably mounted on the vehicle platform with an electric motor coupled to at least one wheel. A drive controller is coupled to the electric motor and a vehicle controller having an input and output terminal is coupled to the drive controller. A data bus network is coupled to the drive controller and the vehicle controller. An A/C bus assembly is coupled to the principal power unit, the power storage unit and the electric motor through the drive controller. Another embodiment of the electronic traction vehicle provides at least four electric motors and four drive controllers coupled to four wheels and the data bus network and A/C power bus assembly. Another embodiment of the electronic traction vehicle provides the components of the vehicle as moduled including an auxiliary module removably connected to the data bus network and the A/C bus assembly.

The present invention also provides an A/C bus assembly for interconnecting removable modules of an electronic traction vehicle. The modules include a principal power unit, a power storage unit an electric motor coupled to at least one wheel of the vehicle, a drive controller coupled to the electric motor, an electric dissipation unit, and a vehicle controller having a user interface all mounted on the vehicle. The A/C bus assembly comprises a first conductor having a first end and a second end and a second conductor having a first end and a second end wherein the first end of each conductor is coupled to the principal power unit and the second end of each conductor is connected to one of the modules. Another embodiment of the A/C bus assembly includes a third conductor having a first end and a second end with the first end coupled to the principal power unit and the second end coupled to one of the modules. A further embodiment of the A/C bus assembly includes a fourth conductor having a first end and a second end with the first end coupled to the principal power unit and the second end coupled to a ground terminal mounted on the vehicle, wherein the fourth conductor provides a neutral for interconnecting the modules. A junction is provided where modules can be connected to each of the conductors.

The present invention also provides a vehicle comprising a vehicle support structure having a plurality of wheels rotably supported by the vehicle structure wherein at least two of the wheels are steerable. A principal power unit is supported by the structure. At least one electric motor is coupled to at least one of the wheels of the vehicle. An electric A/C power bus including at least two phase conductors, wherein the phase conductors are coupled to the principal power unit and a power storage unit. A vehicle controller is coupled to the electric motor and the A/C power bus, a data bus coupled to the vehicle controller and a motor drive controller which communicates signals to the vehicle controller such that the speed and/or torque of the motor are controlled based upon the signals. The motor drive control unit is coupled to the electric motor. Another embodiment of the vehicle includes an energy dissipation unit coupled to the A/C power bus and the data bus and further embodiments of the vehicle includes a plurality of suspension assemblies, wherein each assembly independently suspends one of the wheels relative to the vehicle support structure.

There is further provided a method of transferring selected vehicle data. The method includes generating selected data representative of an electric vehicle. The electric vehicle is of the type including a principal power unit that is not a battery a power storage unit, a plurality of wheels, an electric motor coupled to at least one wheel, a drive controller coupled to the electric motor, a vehicle controller having an input and an output terminal, and coupled to the drive controller and a data bus network, and an AC bus assembly coupled to the principal power unit, the power storage unit, and the electric motor through the drive controller. The method further includes entering the selected data on a terminal, the terminal operationally connected to an Internet server, the internet server operationally connected to the Internet and transmitting the data from the terminal to the Internet through the internet server.

It is further provided a method including communicating over a network data representative of a vehicle of the type including a vehicle structure, a principal power unit supported by the vehicle structure, a power storage unit supported by the vehicle structure, a plurality of wheels rotatably coupled to the vehicle, an AC electric motor coupled to at least one wheel, a drive controller coupled to the AC electric motor, a vehicle controller coupled to the drive controller and a data bus network, and an AC bus assembly coupled to the principal power unit, the power storage unit, and the AC electric motor through the drive controller; and using the data.

There is also provided a method including providing internet access to data representative of a vehicle of the type including an AC bus assembly for interconnecting removable modules of an electric vehicle, the modules including a principal power unit that is not a battery, a power storage unit, an AC electric motor coupled to at least one wheel of the vehicle, a drive controller coupled to the electric motor, an energy dissipation unit, and a vehicle controller having a user interface, the AC bus assembly comprising: a first conductor having a first end and a second end; and a second conductor having a first end and a second end, wherein the first end of each conductor is coupled to the principle power unit and the second end of each conductor is connected to one of the modules; and using the data.

There is additionally provided a method including communicating over a network data representative of a vehicle of the type including: a vehicle support structure, a plurality of wheels rotatably supported by the vehicle structure, wherein at least two of the wheels are steerable, a principal power unit supported by the structure, wherein the principal power unit is not a battery, at least one AC electric motor coupled to at least one of the wheels, an electric AC power bus including at least two phase conductors, wherein the phase conductors are coupled to the principal power unit, a power storage unit coupled to at least one of the wheels, a vehicle controller coupled to the AC power bus, a data bus coupled to the vehicle controller, and a motor drive controller unit coupled to the electric motor and to the data bus to communicate signals to the vehicle controller such that one of the speed and torque of the motor are controlled base upon the signals; and using the data.

DETAILED DESCRIPTION OF EXEMPLARY EMBODIMENTS

Figure 1:
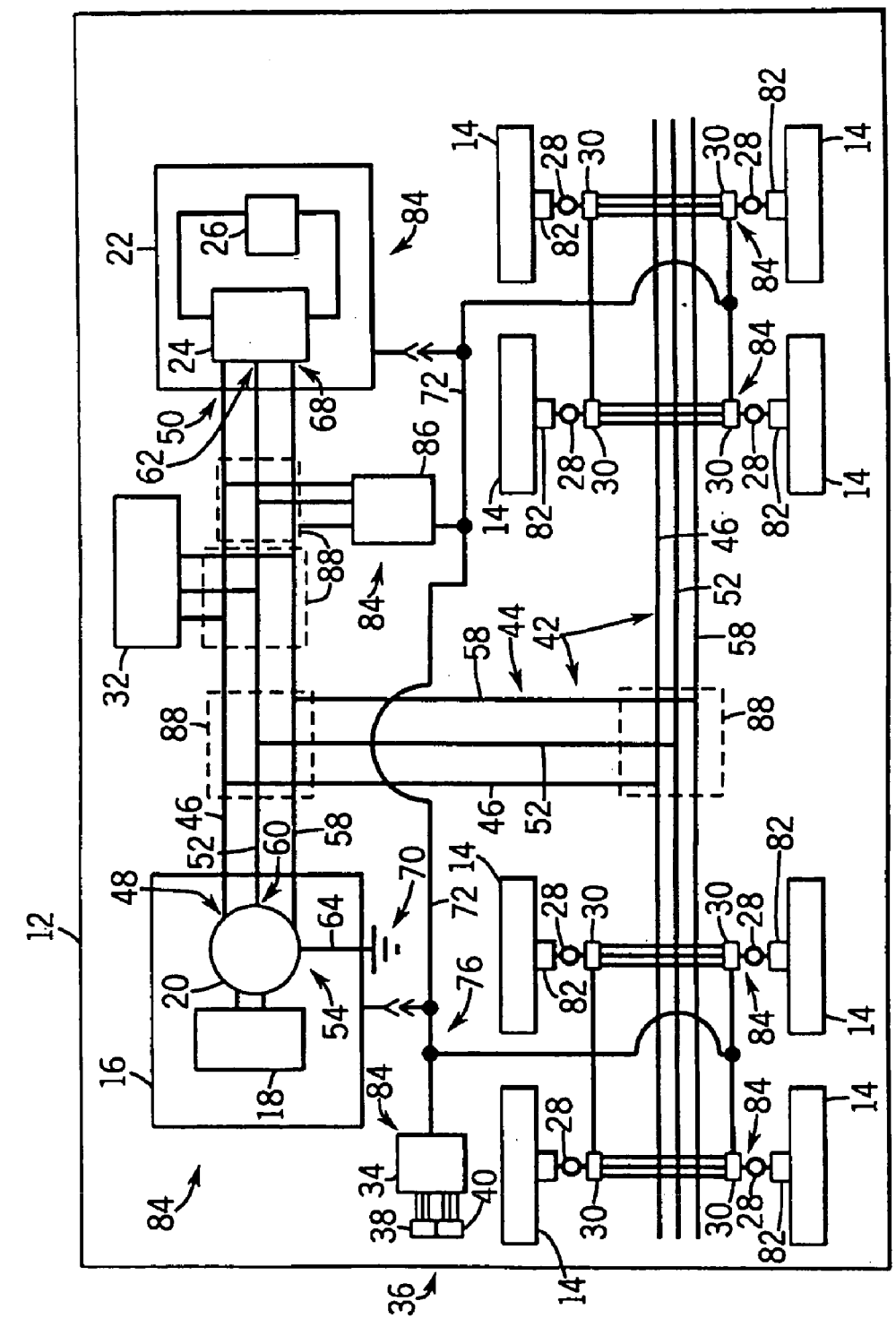
FIG. 1 is a schematic diagram of an exemplary embodiment of an electronic traction vehicle providing an exemplary embodiment of an A/C bus assembly coupled to various modules on the vehicle.

An electronic traction vehicle 10 as illustrated in FIG. 1, comprises a vehicle platform or vehicle support structure 12 upon which various modules 84 are removably mounted. Such modules 84 include a principal power unit 16, a power storage unit 22, an electric motor 28 coupled to at least one wheel 14 of the vehicle 10, a drive controller 30 coupled to the electric motor 28, an energy dissipation unit 32 and a vehicle controller 34 having a user interface 36. Additional modules generally referred to as auxiliary modules 86, can be added to the vehicle 10 as circumstances and the situation warrants.

Interconnecting the modules 84 on the electronic traction vehicle 10 is an A/C Power Bus Assembly 42 and a data bus network 76 through which the vehicle and its various functions are controlled and operated. Specific descriptions of the various modules 84 and their functions will be described hereinafter.

One embodiment of electronic traction vehicle 10 comprises the work platform 12 with a principal power unit 16 mounted on the vehicle platform 12. A power storage unit is mounted on the vehicle platform with a plurality of wheels, rotably mounted on the vehicle platform with an electric motor 28 coupled to at least one wheel. A drive controller 30 is coupled to the electric motor. A vehicle controller 34 having an input terminal 38 and an output 40 terminal is coupled to the drive controller 30 and a data bus network 76. The vehicle controller 34 receives data input from monitors and sensors, as well as from the operator input terminal 38, concerning the speed and power required for vehicle 10 operations. The torque output of each motor 28 is adjusted to meet the requirements established in the vehicle controller 34 from such data input. Coupling the principal power unit 16, the power storage unit 22, and the electric motor 28 through the drive controller 30 is an A/C bus assembly 42. In some instances, the vehicle controller 34 is coupled to one of the principal power units 16 and the power storage unit 22 as determined by an operator of the electronic traction vehicle 10. A continuous track, supported by the wheels 14 can, also be provided.

The electronic traction vehicle 10 can be configured with one or more modules 84 consisting of modular independent coil spring suspensions for steerable and non-steerable wheel assemblies and driver and non-driver axles. Details of such modular independent coil spring suspensions can be found in U.S. Pat. Nos. 5,538,274, 5,820,150 and 6,105,984 incorporated herein by this reference, which are assigned to the assignee of the present invention.

The principal power unit 16 includes a prime mover or engine 18 coupled to a generator or alternator 20. The prime mover 18 can be a fuel cell, a gas turbine, an internal combustion engine or a nuclear power device with the preferred embodiment being a diesel engine. The generator/alternator 20 is coupled to the prime mover and preferably is a synchronous generator producing 460 to 480 volts, three phase, A/C 60 hz power for the electronic traction vehicle 10. However, it is contemplated that different sized generators or alternators can be coupled to the prime mover for purposes of generating either higher or lower electrical power. For instance, a single phase system can be utilized or a system that generates 720 volt power system can be used or a system that operates at a frequency other than 60 hz, such as 50 hz which is typical in European countries. It is also contemplated that the power generated by the principal power unit 16 can be modified by appropriate auxiliary modules 86 such as a step-down transformer to provide power to operate ancillary equipment on or associated with the electronic traction vehicle 10 such as pumps, instruments, tools, lights and other equipment.

Various embodiments of an electronic traction vehicle 10 are based on the number of wheels 14 that are driven on the vehicle 10. For instance, one embodiment includes an electric motor 28 and drive controller 30 coupled to another wheel 14 and coupled to the data bus network 76 and the A/C bus assembly 42. The vehicle 10 can also include four electric motors 28 and four drive controllers 30 which are coupled to four wheels 14 and coupled to the data bus network 76 and the A/C bus assembly 42. As shown in FIG. 1, at least 8 electric motors 28 and electric drive controllers 30 can be coupled to 8 separate wheels 14 and coupled to the data bus network 76 and the A/C bus assembly 42. In all variance of the electronic traction vehicle 10, at least two of the wheels are steerable.

The A/C bus assembly 42 includes a plurality of phase conductors 44. A first conductor 46 having a first end 48 and second end 50 together with a second conductor 52 having a first end 54 and a second end 56 can be configured together with a neutral 64 to provide single phase power in one embodiment of the vehicle 10. A third conductor 58 having a first end 60 and a second end 62 can be used in conjunction with the first conductor 46 and the second conductor 52 to provide three phase power as shown in FIG. 1. The conductors 44 can be stranded metal wire such as copper or aluminum sized and clad to transmit the power generation contemplated in the vehicle 10 design. The conductors 44 can also be solid metal bars, generally referred to as bus bars, composed of appropriate clad metals, such as copper or aluminum, as will be appreciated by one ordinarily skilled in the art.

The electric motor 28 can be an appropriate sized traction motor. An exemplary embodiment of an electronic traction vehicle 10 will provide an A/C, three phase induction electric motor. The motor would have a simple cast rotor, machine mount stator and sealed ball bearings. There would be no brushes, internal switches or sliding contact devices with the rotor as the only moving part of the traction motor. Control of the electric motor is achieved through a drive controller 30 which is coupled to the motor. The torque output of the motor 28 is adjusted based oh the rotational speed and power requirements established by the operator at the vehicle controller 34 and transmitted to the drive controller 30 over the data bus network 76. The drive control 30 is coupled by a data bus 72 into a data bus network 76 which is connected to the vehicle controller 34. Signals 74 generated by the vehicle controller 34, and the drive controller 30 and other modules including auxiliary modules 86 and sensors are processed by the vehicle controller 34 with appropriate input 38 and output provided by the user interface 36. It is also contemplated that wireless communication between the vehicle controller 34 and the various modules 84 can be achieved including communication of signals 74 via radio waves, microwaves, and fiber optical paths including relay via satellite to a central command center.

Figure 2:
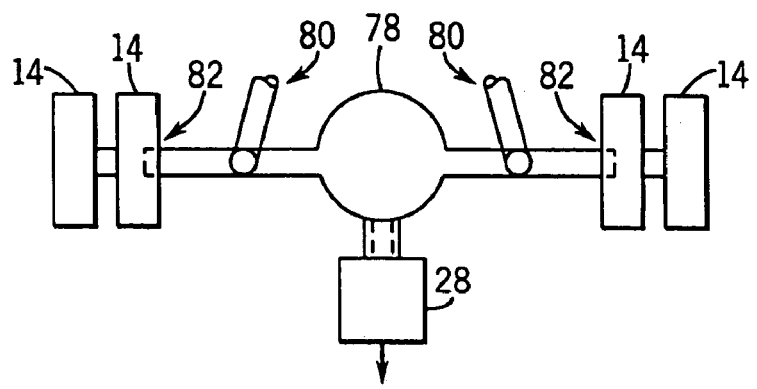
FIG. 2 is a top plan view illustration of an exemplary embodiment of a differential assembly coupled to an electric motor for driving at least two wheels and supported by a suspension assembly.
Figure 3:
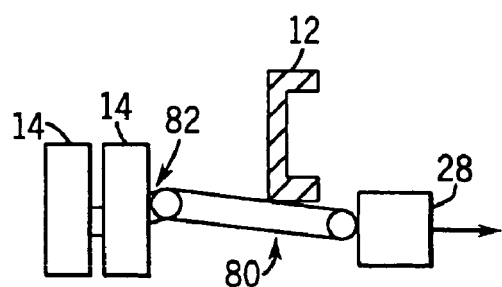
FIG. 3 is an end view partial sectional view of an exemplary embodiment of an electronic traction vehicle support structure coupled to a suspension assembly which suspends at least one wheel relative to the vehicle support structure.

FIGS. 1 and 3 illustrate the wheels 14 being driven directly by an electric motor 28 through an appropriate wheel-end reduction assembly 82 if necessary. A wheel-end reduction assembly 82 can also couple the wheels 14 to a differential assembly 78 via drive shafts. A plurality of wheel-end reduction assemblies 82 can couple the wheels 14 to their respective electric motors 28. Another embodiment of the vehicle 10 includes a differential assembly 78 coupled to the electric motor 28 for driving at least two wheels 14 as shown in FIG. 2. Additional differential assemblies 78, such as three assemblies 78, with each differential assembly coupled to an electric motor 28 for driving at least two wheels, can also be configured in the vehicle 10.

As mentioned above, the vehicle 10 can be provided with the principal power unit 16, the power storage unit 22, the electric motor 28, the drive controller 30, the vehicle controller 34, the suspension assembly 80 and other associated equipment as modules 84 that may be removably mounted on the vehicle platform. The modules 84 are also removably connected to the data bus network 76 and the A/C bus assembly 42. An auxiliary module 86 can be any type of equipment or tool required or associated with the function and operation of the vehicle 10. For example, the auxiliary module can be a pump, a saw, a drill, a light, etc. The auxiliary module 86 is removably connected to the data bus network 76 and the A/C bus assembly 42. A junction 88 is used to facilitate the connection of the modules to the data bus network 76 and the A/C power bus assembly 42 and are located at convenient locations throughout the vehicle 10. The junctions 88 can accommodate various types of connections such as quick connectors, nuts and bolts, solder terminals, or clip terminals or the like. The junction 88 can accommodate the data bus 72 or the phase conductor 44 or both.

Also connected to the A/C power bus assembly 42 is the power storage unit 22. The power storage unit 22 includes an electric power converter 24 and an energy storage device 26. The energy storage unit 22 can be configured to provide electric power above and beyond that required of the principal power unit 16. The energy storage device 26 can be electric capacitors, storage batteries, a flywheel, or hydraulic accumulators. The electric power converter 24 can be configured to convert the A/C power generated by the principal power unit 16 to D/C power and transfer such converted power to an appropriate storage device. The electrical power converter 24 can also convert the energy stored in the energy storage device 26 back to A/C power to augment and supplement the A/C power generated by the principal power unit 16 over the A/C power bus assembly 42. Applicants have determined that an additional 200–300 horse power of short-term power can be provided into the A/C power bus assembly 42 over the phase conductors 44 by discharge of an on-board battery pack (energy storage device 26) under control of the power storage unit 22. The power storage unit 22 may be coupled to the data bus network 76 and controlled by the vehicle controller 34. The combined electrical power from the principal power unit 16 and the power storage unit 22 will all be available on the A/C power bus assembly 42 for use by the electric motors 28 or by any other module 84 or auxiliary module 86 as determined by the operator at the user interface 36 of the vehicle controller 34.

In operation, the power storage unit 22 receives power from the principal power unit 16 over conductors 44 of the A/C power bus assembly 42. The power received is converted into the appropriate energy mode required by the energy storage device 26 and maintained in the energy storage device 26 until required during the operation of the vehicle 10. If the principal power unit 16 is not functioning for any reason, the energy in the power storage unit can be utilized to operate, for a given period of time, the vehicle 10 or any of the modules 84 or auxiliary modules 86 mounted on the vehicle 10.

Energy storage recharge of the power storage unit 22 by the principal power unit 16 will begin automatically and immediately after the vehicle 10 arrives at its destination and will continue during the vehicle's return run to its original location. The state of charge of the power storage unit 22 will be maintained between missions by a simple plug connection to a power receptacle in the vehicle's garage or storage location, which receptacle will automatically disconnect as the vehicle 10 leaves such site. The power storage unit 22 can also receive energy generated by the electric motors 28 when the motors are configured in a regeneration mode in which case they will function as a generator. Such functionality is utilized in a braking procedure for the vehicle is determined by the operator at the user interface 36 of the vehicle controller 34. The electric motor 28 and AC power bus assembly 42 can also be configured to regenerate power back to the principal power unit 16.

An additional module 84 that is provided in another embodiment of the vehicle 10 is an energy dissipation unit 32 coupled to the A/C bus assembly 42 and the data bus network 76. If it is determined that the principal power unit 16 or the electric motors 28 or any other auxiliary module 86 generating too much power or are not utilizing sufficient power, the excess power can be dissipated through the energy dissipation device 32. An example of an energy dissipation device 32 is a resistive coil that may be additionally cooled by fans or an appropriate fluid. Another example of an energy dissipation unit 32 is a steam generator which utilizes excess heat generated in the vehicle to heat water to produce steam.

Figure 4:
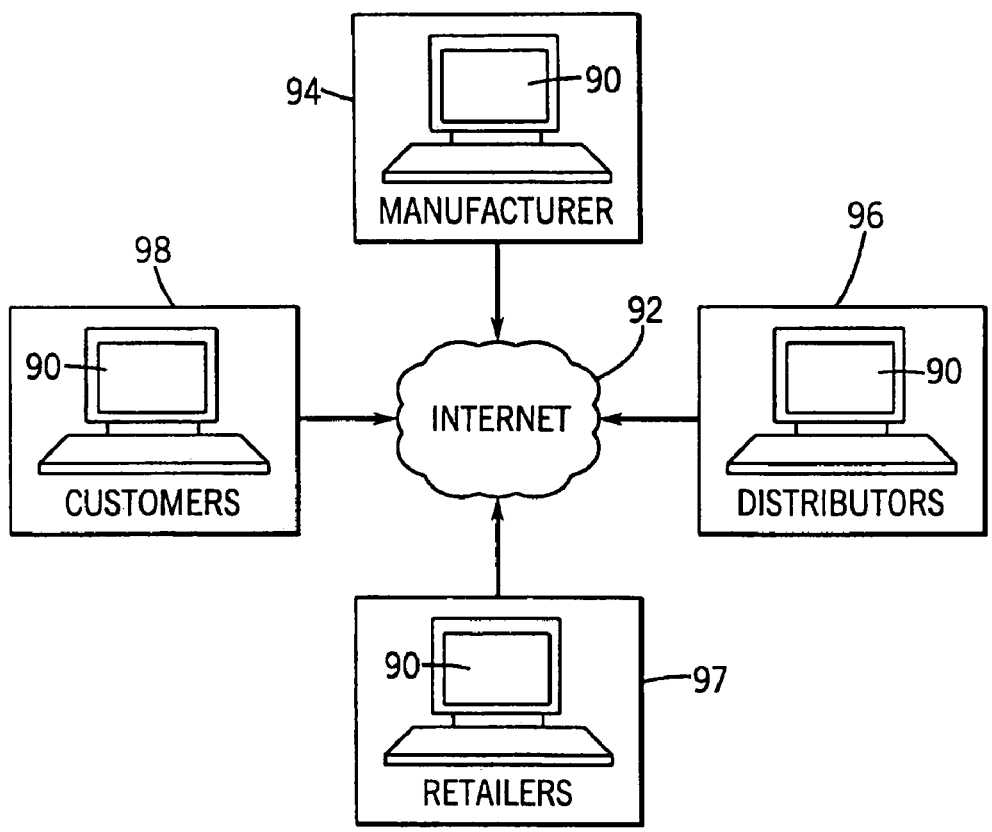
FIG. 4 is a schematic block diagram illustrating the various entities connected to the Internet for the transmission of data indicative of an electronic traction vehicle.

Referring to FIG. 4, a method of transferring data indicative of an electronic traction vehicle 10 to potential customers over the Internet 92 includes obtaining information on an electronic traction vehicle 10 including dates, prices, shipping times, shipping locations, general shipping data, module type, inventory, specification information, graphics, source data, trademarks, certification marks and combinations thereof. The method further includes entering the information on to a terminal 90 that is operationally connected to an Internet server. Terminal 90 may be a microprocessor, a computer, or other conventionally known device capable of operationally connecting to a conventionally known Internet server. The method further includes transmitting to the information from terminal 90 to the Internet server that is operationally connected to Internet 92. The method allows manufacturers 94, distributors 96, retailers 97 and customers 98, through the use of terminals 90, to transmit information, regarding the electronic traction vehicle 10 and the potential sale of the electronic traction vehicle 10 to customers, to one another individually, collectively or by any combination thereof.

Thus, there is provided an electronic traction vehicle of modular design with the modules interconnected by an A/C bus assembly and a data bus network. Although the invention has been described in conjunction with specific embodiments, thereof, it is evident that many alternatives, modifications and variations will be apparent to those ordinarily skilled in the art. For example, an electronic traction vehicle using a modular component design can be utilized as a fire truck for use at an airport or one that can negotiate severe off road terrain. The vehicle can also be used in a military configuration with the ability to negotiate extreme side slopes and negotiate extreme maneuvers at high speeds. The modular aspect of the vehicle architecture will allow for optimum placement of components to maximize performance with regard to center of gravity which will facilitate its operational capabilities. Accordingly, it is intended to embrace all such alternatives, modifications and variations that fall within the spirit and scope of the appended claims.

What is claimed is:

1. A method of transferring vehicle data relating to an electric vehicle, the steps of the method comprising:
   generating data relating to the electric vehicle, the data representing a plurality of vehicle information, the plurality of vehicle information including price, locations, dates, inventory, and specification information, the plurality of vehicle information further including a customized combination of select vehicle information selectable by a user, wherein the customized combination comprises a plurality of the following: shipping data, module type, graphics, source data, trademark, and certification marks;
   entering the data on a terminal, the terminal operationally connected to an Internet server, the Internet server operationally connected to the Internet; and
   transmitting the data from the terminal to the Internet through the Internet server;
   wherein the electric vehicle includes a principal power unit that is not a battery, a power storage unit, a plurality of wheels, an electric motor coupled to at least one wheel, a drive controller coupled to the electric motor, a vehicle controller having an input and output terminal, the vehicle controller being coupled to the drive controller and a data bus network, and an AC bus assembly coupled to the principal power unit, the power storage unit, and the electric motor through the drive controller.

2. The method of claim 1, wherein the terminal is a computer.

3. The method of claim 2, wherein the data is representative of information about one or more of the following characteristics of the vehicle:
   number of wheels; frequency of the power system; voltage of the power system; number of electric motors; type of principal power unit; and number of phases in the AC bus assembly.

4. A method of communicating over a network vehicle data relating to an electric vehicle, the steps of the method comprising:
   generating data relating to the electric vehicle, the data representing a plurality of vehicle information, the plurality of vehicle information including price, locations, dates, inventory, and specification information, the plurality of vehicle information further including a customized combination of select vehicle information selectable by a user, wherein the customized combination comprises a plurality of the following: shipping data, module type, graphics, source data, trademark, and certification marks;
   entering the data on a terminal, the terminal operationally connected to an Internet server, the Internet server operationally connected to the Internet; and
   transmitting the data from the terminal to the Internet through the Internet server;
   wherein the electric vehicle includes a principal power unit that is not a battery, a power storage unit, a plurality of wheels, an electric motor coupled to at least one wheel, a drive controller coupled to the electric motor, a vehicle controller having an input and output terminal, the vehicle controller being coupled to the drive controller and a data bus network, and an AC bus assembly coupled to the principal power unit, the power storage unit, and the electric motor through the drive controller; and
   using the data for vehicle identity.

5. The method of claim 4, wherein the principal power unit, the power storage unit, the electric motor, the drive controller, and the vehicle controller are modules removably coupled to the vehicle structure and removably coupled to the data bus network and the AC bus assembly.

6. The method of claim 4, wherein the AC electric motor is configured to regenerate power back to one of the principal power unit and the power storage unit.

7. The method of claim 4, wherein the network is the internet.

8. A method of generating vehicle data representative of a vehicle, the steps of the method comprising:
   generating data relating to the electric vehicle, the data representing a plurality of vehicle information, the plurality of vehicle information including price, locations, dates, inventory, and specification information, the plurality of vehicle information further including a customized combination of select vehicle information selectable by a user, wherein the customized combination comprises a plurality of the following: shipping data, module type, graphics, source data, trademark, and certification marks;

wherein the vehicle includes:
an AC bus assembly for interconnecting removable modules of an electric vehicle, the modules including a principal power unit that is not a battery, a power storage unit,
an AC electric motor coupled to at least one wheel of the vehicle,
a drive controller coupled to the electric motor,
an energy dissipation unit, and
a vehicle controller having a user interface, the AC bus assembly comprising: a first conductor having a first end and a second end; and a second conductor having a first end and a second end, wherein the first end of each conductor is coupled to the principle power unit and the second end of each conductor is connected to one of the modules; and
using the data for vehicle identity.

9. The method of claim 8, wherein the AC bus assembly includes at least one additional conductor coupled to the principal power unit and one of the modules.

10. The method of claim 8, wherein the vehicle includes a data bus network coupled to each module.

11. A method of communicating over a network vehicle data relating to an electric vehicle, the steps of the method comprising:
generating data relating to the electric vehicle, the data representing a plurality of vehicle information, the plurality of vehicle information including price, locations, dates, inventory, and specification information, the plurality of vehicle information further including a customized combination of select vehicle information selectable by a user, wherein the customized combination comprises a plurality of the following: shipping data, module type, graphics, source data, trademark, and certification marks;
entering the data on a terminal, the terminal operationally connected to an Internet server, the Internet server operationally connected to the Internet; and
transmitting the data from the terminal to the Internet through the Internet server;
wherein the electric vehicle includes:
a vehicle support structure;
a plurality of wheels rotatably supported by the vehicle structure, wherein at least two of the wheels are steerable;
a principal power unit supported by the structure, wherein the principal power unit is not a battery;
at least one AC electric motor coupled to at least one of the wheels;
an electric AC power bus including at least two phase conductors, wherein the phase conductors are coupled to the principal power unit;
a power storage unit coupled to at least one of the wheels;
a vehicle controller coupled to the AC power bus;
a data bus coupled to the vehicle controller; and
a motor drive controller unit coupled to the electric motor and to the data bus to communicate signals to the vehicle controller such that one of the speed and torque of the motor are controlled base upon the signals; and
using the data for vehicle identity.

12. The method of claim 11, wherein the vehicle includes a plurality of suspension assemblies, wherein each assembly independently suspends one of the wheels relative to the vehicle support structure.

13. The method of claim 11, wherein the AC electric motor is configured to regenerate power back to one of the principal power unit and the power storage unit.

14. The method of claim 11, wherein the network is the internet.

* * * * *

UNITED STATES PATENT AND TRADEMARK OFFICE
CERTIFICATE OF CORRECTION

PATENT NO. : 7,164,977 B2  
APPLICATION NO. : 10/718051  
DATED : January 16, 2007  
INVENTOR(S) : Christopher K. Yakes and Jon J. Morrow It is certified that error appears in the above-identified patent and that said Letters Patent is hereby corrected as shown below:

Column 9:  
lines 12 and 13, replace "not a battery, a power storage unit," with  
--not a battery,  
a power storage unit,--

Signed and Sealed this

Third Day of April, 2007

JON W. DUDAS  
*Director of the United States Patent and Trademark Office*